(12) United States Patent
Onodera et al.

(10) Patent No.: US 9,273,224 B2
(45) Date of Patent: Mar. 1, 2016

(54) COATING AGENT COMPOSITION

(75) Inventors: Satoshi Onodera, Chiba (JP); Toru Masatomi, Ichihara (JP); Motoshi Sasaki, Ichihari (JP)

(73) Assignee: DOW CORNING TORAY CO., LTD., Tokyo (JP)

( * ) Notice: Subject to any disclaimer, the term of this patent is extended or adjusted under 35 U.S.C. 154(b) by 0 days.

(21) Appl. No.: 12/993,575

(22) PCT Filed: Jun. 3, 2009

(86) PCT No.: PCT/JP2009/060646
§ 371 (c)(1),
(2), (4) Date: Nov. 19, 2010

(87) PCT Pub. No.: WO2009/151088
PCT Pub. Date: Dec. 17, 2009

(65) Prior Publication Data
US 2011/0124800 A1 May 26, 2011

(30) Foreign Application Priority Data

Jun. 11, 2008 (JP) ................................. 2008-153185

(51) Int. Cl.
*C09D 143/04* (2006.01)
(52) U.S. Cl.
CPC .................................... *C09D 143/04* (2013.01)
(58) Field of Classification Search
CPC .. C09D 5/4411; C09D 133/06; C09D 133/08; C09D 133/10; C09D 143/04; C09D 201/10
USPC ............................... 526/279; 524/588; 528/10
See application file for complete search history.

(56) References Cited

U.S. PATENT DOCUMENTS

| | | | |
|---|---|---|---|
| 4,988,788 A | 1/1991 | Takarada | |
| 6,326,011 B1 * | 12/2001 | Miyazawa et al. | 424/401 |
| 7,795,360 B2 * | 9/2010 | Masatomi et al. | 526/279 |
| 8,257,776 B2 | 9/2012 | Miyazawa | |

FOREIGN PATENT DOCUMENTS

| | | | | |
|---|---|---|---|---|
| EP | 1642946 A1 * | 4/2006 | ........... | C09D 133/14 |
| JP | 63168469 A | 7/1988 | | |
| JP | 02-064110 A | 3/1990 | | |
| JP | 03-024148 A | 2/1991 | | |
| JP | 03-069950 A | 11/1991 | | |
| JP | 03-252414 A | 11/1991 | | |
| JP | 04-103668 A | 4/1992 | | |
| JP | 07-150105 A | 6/1995 | | |
| JP | 10-101765 A | 4/1998 | | |
| JP | 11-217389 A | 8/1999 | | |
| JP | 2001-234072 A | 8/2001 | | |
| JP | 2003-147214 A | 5/2003 | | |
| JP | 2004-051575 A | 2/2004 | | |
| JP | 2004-231758 A | 8/2004 | | |
| JP | 2006-335925 A | 12/2006 | | |
| JP | 2009-101318 A | 5/2009 | | |
| WO | WO 98/54255 A1 | 12/1998 | | |
| WO | WO 2005-000981 A1 | 1/2005 | | |

OTHER PUBLICATIONS

English language abstract for JP 63-168469 extracted from espacenet.com database Feb. 1, 2011, 11 pages.
English language abstract for JP 03-024148 extracted from espacenet.com database Nov. 1, 2010, 8 pages.
English language abstract for JP 02-064110 extracted from PAJ database, Nov. 1, 2010, 8 pages.
Japanese Patent No. JP 03-069950, 8 pages, English language translation and abstract not available.
English language abstract for JP 03-252414 extracted from PAJ database, Nov. 1, 2010, 8 pages.
English language abstract for JP 04-103668 extracted from PAJ database, Nov. 1, 2010, 13 pages.
English language translation and abstract for JP 07-150105 extracted from PAJ database, Feb. 1, 2011, 28 pages.
English language translation and abstract for JP 10-101765 extracted from PAJ database, Feb. 4, 2011, 35 pages.
English language translation and abstract for JP11-217389 extracted from PAJ database, Feb. 4, 2011, 74 pages.
English language translation and abstract for WO 2005-000981 extracted from espacenet.com database, Feb. 1, 2011, 22 pages.
PCT International Search Report for PCT/JP2009/060646, dated Jul. 31, 2009, 3 pages.
English language abstract and machine-assisted English translation for JP 2001-234072 extracted from the PAJ database on Apr. 3, 2013, 49 pages.
English language abstract and machine-assisted English translation for JP 2003-147214 extracted from the PAJ database on Apr. 3, 2013, 54 pages.

(Continued)

*Primary Examiner* — Mark Kaucher
(74) *Attorney, Agent, or Firm* — Howard & Howard Attorneys PLLC

(57) ABSTRACT

To provide a coating agent composition that cures to form a transparent film that exhibits a high water repellency, a high durability, and an excellent adhesiveness to substrate. A coating agent composition that characteristically comprises (A) an acrylic copolymer obtained by the radical copolymerization of (A1) 1 mole silane compound represented by the general formula: $CH_2=C(R^1)-COO-Q-SiR^2_n(OR^3)_{3-n}$, (A2) 3.70 to 6.20 moles of at least one compound that contains a vinyl polymerizable unsaturated bond, and (A3) 1.05 to 1.80 moles of a siloxysilane compound represented by general formula (2): $CH_2=C(R^1)-COO-Q-Si(OSiR^4_3)_3$ at an molar ratio $(A1)/\{(A1)+(A2)+(A3)\}=0.11$ to $0.17$; and (B) a condensation reaction catalyst.

20 Claims, No Drawings

(56) References Cited

OTHER PUBLICATIONS

English language abstract and machine-assisted English translation for JP 2004-051575 extracted from the PAJ database on Apr. 3, 2013, 37 pages.

English language abstract and machine-assisted English translation for JP 2004-231758 extracted from the PAJ database on Apr. 2, 2013, 124 pages.

English language abstract and machine-assisted English translation for JP 2006-335925 extracted from the PAJ database on Apr. 3, 2013, 83 pages.

English language abstract for JP 2009-101318 extracted from the espacenet.com database on Apr. 3, 2013, 21 pages.

See front page of published PCT application WO 98/54255 A1 for the English language abstract, date: 1998.

* cited by examiner

COATING AGENT COMPOSITION

RELATED APPLICATIONS

This application claims priority to and all the advantages of International Patent Application No. PCT/JP2009/0060646, filed on Jun. 3, 2009, which claims priority to Japanese Patent Application No. JP 2008-153185, filed on Jun. 11, 2008.

TECHNICAL FIELD

The present invention relates to a coating agent composition and more particularly relates to a coating agent composition that exhibits an excellent storage stability and an excellent coatability prior to its cure and that cures to form a transparent film that exhibits a high water repellency, an excellent durability, and an excellent adhesiveness to substrate.

BACKGROUND ART

Acrylic resin-based coating agent compositions are used as coating agents for a variety of substrates used for building exteriors. A drawback with coating agent compositions of this type, however, has been their poor hardness, water repellency, durability, and adhesiveness to substrate. Quite a few coating agent compositions have heretofore been proposed in order to address this drawback. The following, for example, have been proposed: curable compositions in which the base component is a hydrolyzable silyl group-containing acrylic copolymer (refer to Patent References 1 and 2); a composition comprising a hydrolyzable silyl group-containing acrylic polymer, a silanol-functional organopolysiloxane, and a condensation reaction catalyst (refer to Patent Reference 3); and a composition comprising a condensation reaction-promoting catalyst, silanol-functional organopolysiloxane, and an acrylic polymer that contains both the hydroxyl group and a hydrolyzable silyl group (refer to Patent Reference 4). However, all of these compositions provide coating films that suffer from an inadequate water repellency and/or an inadequate durability.

The following have also been proposed: curable resin compositions (refer to Patent References 6 and 7) and a room-temperature-curable coating composition (refer to Patent Reference 5) comprising a siloxane-containing acrylic copolymer obtained by the copolymerization of an alkyl methacrylate, low molecular weight siloxane-containing methacrylate, and a silane compound that contains a hydrolyzable functional group and a radically polymerizable unsaturated group. However, the coating film yielded by this room-temperature-curable coating composition exhibits an inadequate water repellency due to the inadequate number of siloxane units in the low molecular weight siloxane-containing methacrylate. In addition, because the low molecular weight siloxane-containing methacrylate contains the dialkylsiloxane unit, the cured coating is soft and lacks an acceptable durability. Another drawback is that the low molecular weight siloxane-containing methacrylate is produced by a hydrosilylation reaction using a platinum catalyst; as a consequence, the coating film is prone to discoloration due to the platinum catalyst remaining in the room-temperature-curable coating composition.

The present inventors therefore proposed, in Patent Reference 8, a coating agent composition comprising an acrylic copolymer obtained by the radical polymerization of an acryloxy group-containing silane compound, a vinyl polymerizable unsaturated bond-containing compound, and an acryloxy group-containing siloxysilane compound (refer to Patent Reference 8). While this coating agent composition does cure to form a highly water-repellent, highly durable high-hardness cured film on substrates, the water repellency of the resulting cured film surface, the transparency, the durability, and the adhesiveness to substrate are not yet entirely satisfactory when this coating agent composition is used to coat a soft, lightweight substrate such as plastic substrates and particularly the transparent plastics used as glass substitutes (this application requires a long-term staining resistance and weathering resistance).

[Patent Reference 1] JP 02-064110 A
[Patent Reference 2] JP 03-024148 A
[Patent Reference 3] JP 03-252414 A
[Patent Reference 4] JP 07-150105 A
[Patent Reference 5] JP 03-069950 B
[Patent Reference 6] JP 04-103668 A
[Patent Reference 7] JP 10-101765 A
[Patent Reference 8] WO 2005/000981

SUMMARY OF INVENTION

Technical Problems to be Solved

The present inventors came to the present invention as a result of intensive investigations in order to solve the drawbacks identified above. Thus, an object of the present invention is to provide a coating agent composition that exhibits an excellent storage stability and an excellent coatability prior to its cure and that cures to form a transparent film that exhibits a high water repellency, a high hardness, and an excellent adhesiveness to substrate.

The aforementioned object is achieved by a coating agent composition that comprises (A) 100 weight parts of an acrylic copolymer that has a weight-average molecular weight of 10,000 to 100,000 and that is obtained by the radical copolymerization of (A1) a silane compound represented by general formula (1)

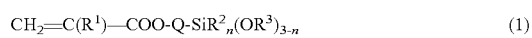

$$CH_2=C(R^1)-COO-Q-SiR^2_n(OR^3)_{3-n} \quad (1)$$

(in the formula, $R^1$ is the hydrogen atom or methyl group; Q is $C_{2-6}$ divalent aliphatic hydrocarbyl; $R^2$ is unsubstituted or substituted $C_{1-8}$ monovalent hydrocarbyl; $R^3$ is $C_{1-4}$ aliphatic hydrocarbyl; and n is an integer from 0 to 2), (A2) at least one compound that contains a vinyl polymerizable unsaturated bond, said compound being selected from acrylic compounds (excluding component (A1)), vinylic compounds, and styrenic compounds, at 3.70 to 6.20 moles per 1 mole component (A1), and (A3) a siloxysilane compound represented by general formula (2), at 1.05 to 1.80 moles per 1 mole component (A1)

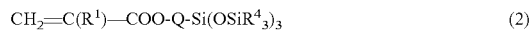

$$CH_2=C(R^1)-COO-Q-Si(OSiR^4_3)_3 \quad (2)$$

(in the formula, $R^1$ and Q are defined as above and $R^4$ is $C_{1-4}$ alkyl)

at an molar ratio (A1)/{(A1)+(A2)+(A3)}=0.11 to 0.17; and (B) a condensation reaction-promoting catalyst in a catalytic amount.

Solution to Problems

The aforementioned objects are achieved by

[1] A coating agent composition that comprises
(A) 100 weight parts of an acrylic copolymer that has a weight-average molecular weight of 10,000 to 100,000 and that is obtained by the radical copolymerization of
(A1) a silane compound represented by general formula (1)

$$CH_2=C(R^1)-COO-Q-SiR^2_n(OR^3)_{3-n} \quad (1)$$

(in the formula, $R^1$ is the hydrogen atom or methyl group; Q is $C_{2-6}$ divalent aliphatic hydrocarbyl; $R^2$ is unsubstituted or substituted $C_{1-8}$ monovalent hydrocarbyl; $R^3$ is $C_{1-4}$ aliphatic hydrocarbyl; and n is an integer from 0 to 2),
(A2) at least one compound that contains a vinyl polymerizable unsaturated bond, said compound being selected from acrylic compounds (excluding component (A1)), vinylic compounds, and styrenic compounds, at 3.70 to 6.20 moles per 1 mole component (A1), and
(A3) a siloxysilane compound represented by general formula (2), at 1.05 to 1.80 moles per 1 mole component (A1)

$$CH_2=C(R^1)-COO-Q-Si(OSiR^4_3)_3 \quad (2)$$

(in the formula, $R^1$ and Q are defined as above and $R^4$ is $C_{1-4}$ alkyl)
at an molar ratio (A1)/{(A1)+(A2)+(A3)}=0.11 to 0.17; and
(B) a condensation reaction-promoting catalyst in a catalytic amount.

[2] The coating agent composition according to [1], that further comprises
(C) organic solvent, in an amount sufficient to dissolve component (A).

[3] The coating agent composition according to [1] or [2], that further comprises
(D) aminosilane coupling agent, at 0.1 to 10 weight parts per 100 weight parts component (A).

[4] The coating agent composition according to [3], characterized in that component (D) is selected from the group consisting of 3-aminopropyltriethoxysilane, 3-aminopropyltrimethoxysilane, 3-aminopropylmethyldiethoxysilane, 3-aminopropylmethyldimethoxysilane, 3-(2-aminoethyl)aminopropyltrimethoxysilane, 3-(2-aminoethyl)aminopropylmethyldimethoxysilane, and 3-anilinopropyltrimethoxysilane.

[5] The coating agent composition according to any of [1] to [3], characterized in that the acrylic copolymer is obtained by radical copolymerization using an azo compound at 0.30 to 0.99 mole per 100 moles of the total of components (A1) to (A3).

[6] The coating agent composition according to any of [1] to [3], characterized in that component (A2) is an alkyl methacrylate.

[7] The coating agent composition according to any of [1] to [3], wherein component (A1) is a silane compound selected from the group consisting of 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, and 3-methacryloxypropylmethyldiethoxysilane.

Advantageous Effects of Invention

The present invention provides a coating agent composition that exhibits an excellent storage stability and an excellent coatability prior to its cure and that cures to form a transparent film that exhibits a high water repellency, a high hardness, and an excellent adhesiveness to substrate.

DESCRIPTION OF EMBODIMENTS

Component (A) is the base component of the coating agent of the present invention and is a high molecular weight acrylic copolymer obtained by the radical copolymerization of components (A1) to (A3) at prescribed quantities and a prescribed molar ratio. Component (A) according to the present invention, vide infra, is characterized from a structural standpoint by having a larger content of structural units originating from components (A2) and (A3) than the acrylic copolymers disclosed in the prior art.

Component (A1) is a silane compound represented by general formula (1).

$$CH_2=C(R^1)-COO-Q-SiR^2_n(OR^3)_{3-n} \quad (1)$$

$R^1$ in this formula is the hydrogen atom or methyl group. The moiety Q is $C_{2-6}$ divalent aliphatic hydrocarbyl wherein alkylene, e.g., ethylene, propylene, butylene, and so forth, is preferred. $R^2$ is unsubstituted or substituted $C_{1-8}$ monovalent hydrocarbyl and can be exemplified by alkyl such as methyl, ethyl, propyl, butyl, and so forth, and by aryl such as phenyl and so forth. $R^3$ is $C_{1-4}$ aliphatic hydrocarbyl and can be exemplified by alkyl such as methyl, ethyl, propyl, butyl, and so forth, and by alkenyl such as propenyl, butenyl, and so forth. n is an integer from 0 to 2 and is preferably 0 or 1. Component (A1) can be exemplified by 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, 3-methacryloxypropylmethyldiethoxysilane, 3-methacryloxypropyltri(isopropexy)silane, and 3-acryloxypropyltri(isopropexy)silane, wherein 3-methacryloxypropyltrimethoxysilane is the most suitable.

Component (A2) is at least one compound that contains a vinyl polymerizable unsaturated bond, said compound being selected from acrylic compounds (excluding component (A1)), vinylic compounds, and styrenic compounds. Component (A2) is a component that, in combination with the other components (A1) and (A3), constitutes the acrylic copolymer that is component (A). The radical copolymerization of 3.70 to 6.20 moles component (A2) per 1 mole of the silane compound (A1) is required for the component (A) according to the present invention, while the radical copolymerization of 4.10 to 5.50 moles component (A2) per 1 mole of the silane compound (A1) is preferred. When component (A2) is reacted in an amount less than the lower limit cited above, the cured film yielded by the cure of the resulting acrylic copolymer exhibits an unsatisfactory durability and in particular exhibits an unsatisfactory resistance to scratching or abrasion. When, on the other hand, component (A2) is reacted in an amount in excess of the upper limit cited above, the staining resistance of the cured film, for example, the water repellency, becomes inadequate.

Acrylate esters and methacrylate esters are preferred for the acrylic compounds encompassed by component (A2) and can be specifically exemplified by methyl methacrylate, methyl acrylate, ethyl methacrylate, ethyl acrylate, butyl methacrylate, butyl acrylate, 2-(dimethylamino)ethyl methacrylate, 2-(dimethylamino)ethyl acrylate, 3-(dimethylamino)propyl methacrylate, 3-(dimethylamino)propyl acrylate, 2-(diethylamino)ethyl methacrylate, and 2-(diethylamino)ethyl acrylate. Alkyl methacrylates are preferred among the preceding, and methyl methacrylate is particularly preferred. The vinylic compounds can be exemplified by vinyl acetate, methyl vinyl ether, ethyl vinyl ether, methyl vinyl ketone, and ethyl vinyl ketone, whereamong vinyl acetate is preferred. The styrenic compounds can be exemplified by styrene, α-methylstyrene, and p-methylstyrene. A single selection from among the preceding compounds may be used as component (A2) or a mixture of two or more selections may be used for component (A2).

Component (A3) is a siloxysilane compound represented by general formula (2)

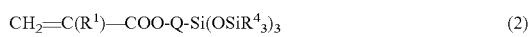  (2)

wherein $R^1$ and Q are defined as above and $R^4$ is $C_{1-4}$ alkyl and can be exemplified by methyl, ethyl, propyl, and butyl. Component (A3) is a component that, in combination with the other components (A1) and (A2), constitutes the acrylic copolymer that is component (A). The radical copolymerization of 1.05 to 1.80 moles of component (A3) per 1 mole of the silane compound (A1) is required in the present invention, while the radical copolymerization of 1.20 to 1.60 moles of component (A3) per 1 mole of the silane compound (A1) is preferred. When component (A3) is reacted in an amount less than the lower limit cited above, the cured film yielded by the cure of the resulting acrylic copolymer exhibits an unsatisfactory stain resistance (an unsatisfactory water repellency in particular) and an unsatisfactory durability (an unsatisfactory resistance to scratching or abrasion in particular). When, on the other hand, component (A3) is reacted in an amount in excess of the upper limit cited above, the cured film has an unsatisfactory hardness.

Component (A3) can be exemplified by the tris(trialkylsiloxy)silane compounds with the formulas given below, wherein Me=methyl, Et=ethyl, and Pr=propyl.

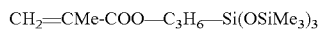

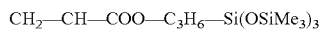

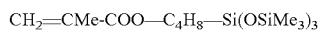

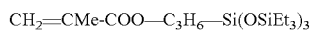

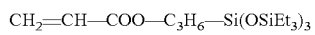

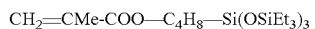

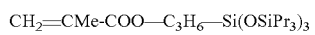

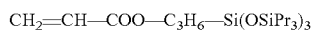

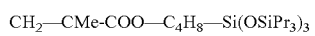

There are no particular limitations on the method of producing component (A3), and, for example, component (A3) can be obtained by reacting a tris(trialkylsiloxy)silane with allyl acrylate or allyl methacrylate in the presence of a platinum catalyst or, as described in JP 11-217389 A, by reacting a methacryloxyalkyltrialkoxysilane with a hexaalkyldisiloxane in the presence of a carboxylic acid and an acid catalyst. However, platinum remains in the monomer when a platinum catalyst is used, which creates the possibility of adverse effects on the storage stability and properties of the final product. For this reason, production is preferably carried out by reacting a methacryloxyalkyltrialkoxysilane with a hexaalkyldisiloxane in the presence of acetic acid and an acid catalyst.

Component (A) according to the present invention characteristically is an acrylic copolymer that has a weight-average molecular weight of 10,000 to 100,000 and that is obtained by the radical copolymerization of the previously described components (A1) to (A3) and characteristically contains the structural units derived from these components in a specific amount of incorporation and in a specific ratio. Thus, 3.70 to 6.20 moles of component (A2) and 1.05 to 1.80 moles of component (A3) must be radically copolymerized per 1 mole component (A1) at an molar ratio (A1)/{(A1)+(A2)+(A3)}=0.11 to 0.17. This radical copolymerization is particularly preferably carried out at an molar ratio (A1)/{(A1)+(A2)+(A3)}=0.12 to 0.16. When the ratio of component (A1) with respect to the sum of components (A1) to (A3) is less than the lower limit cited above, the cured film yielded by the cure of the resulting acrylic copolymer exhibits an unsatisfactory hardness and an unsatisfactory durability (particularly an unsatisfactory resistance to scratching or abrasion). When, on the other hand, this ratio for component (A1) exceeds the upper limit cited above, the cured film exhibits an unsatisfactory water repellency.

While component (A) is produced by the radical copolymerization of the previously described components (A1) to (A3), the execution of copolymerization using an azo compound at 0.30 to 0.99 mole per 100 moles of the total of components (A1) to (A3) enables a very efficient synthesis of high molecular weight acrylic copolymer with a weight-average molecular weight of 10,000 to 100,000. That is, the use as the polymerization initiator of an azo compound in the specified amount accrues the following advantages: it enables the facile production of the high molecular weight component (A) that is required by the present invention, and it enables the facile production of a coating agent composition that exhibits an excellent coatability and an excellent storage stability.

In addition to 2,2'-azobisisobutyronitrile, the azo compound can be specifically exemplified by 2,2'-azobis-2-methylbutyronitrile, 2,2'-azobis-2,4-dimethylvaleronitrile, 2,2'-azobiscyclohexanecarbonitrile, and so forth. Radical polymerization catalysts other than azo compounds may also be used, for example, organoperoxides such as benzoyl peroxide, lauroyl peroxide, and so forth.

Component (A) can be produced by known radical copolymerization reaction methods. For example, components (A1) to (A3) can be copolymerized using an azo compound in an organic solvent (component (C), described below) in an inert atmosphere. The weight-average molecular weight of component (A) is 10,000 to 100,000 and is preferably 20,000 to 80,000.

The condensation reaction-promoting catalyst (B) makes it possible for crosslinking to occur by condensation between/among the alkoxysilyl groups and/or the alkenyloxysilyl groups in the previously described component (A). The condensation reaction-promoting catalyst used in the coating agent composition of the present invention can be exemplified by known condensation reaction-promoting catalysts, for example, tetravalent tin compounds such as dialkyltin dicarboxylates; divalent tin compounds such as tin octylate; monoalkyltin compounds such as monobutyltin compounds and monooctyltin compounds; titanate esters such as tetrabutyl titanate, tetrapropyl titanate, tetra(2-ethylhexyl) titanate, and isopropoxytitanium bis(ethyl acetoacetate); organoaluminum compounds such as aluminum trisacetylacetonate, aluminum tris(ethyl acetoacetate), and diisopropoxyaluminum ethyl acetoacetate; the metal salts of carboxylic acids (e.g., 2-ethylhexanoic acid, neodecanoic acid, versatic acid, oleic acid, naphthenic acid, and so forth) such as bismuth carboxylates, as well as the mixtures and reaction products of the preceding with amine compounds such as laurylamine; chelate compounds such as zirconium tetraacetylacetonate; aliphatic primary amines such as methylamine; aliphatic secondary amines such as dimethylamine; aliphatic tertiary amines such as triamylamine; aliphatic unsaturated amines such as triallylamine; aromatic amines such as laurylaniline; other amines such as monoethanolamine; the salts of these amine compounds with carboxylic acids; also, other acid catalysts, e.g., aliphatic acids such as versatic acid, as well as acidic organophosphate ester compounds; and other base catalysts. A single one of these condensation reaction-promoting catalysts may be used or two or more may be used in combination. Organic acid+amine binary systems, which are metal-free condensation reaction-promoting catalysts, exhibit a high catalytic activity and as a consequence are more preferred from the standpoint of enabling a reduction in the quantity of use. Among organic acid+amine binary systems, acidic phosphate ester+amine binary systems and organic carboxylic acid+amine binary systems and particularly acidic organophosphate ester+amine binary systems and aliphatic carboxylic acid+amine binary systems exhibit a high catalytic activity and are preferred for their ability to bring about fast curing.

Component (B) is incorporated in a catalytic amount, and the amount of component (B) can be selected as appropriate in view of the type of catalyst, supra, and the desired cure rate. In general, component (B) is preferably incorporated in the range of 0.1 to 8 weight parts per 100 weight parts component (A). In addition, condensation reaction-promoting catalysts other than tin compounds are preferably selected for component (B) in order to avoid environmental consequences.

The coating agent composition of the present invention comprises the previously described components (A) and (B), but in addition to these components preferably also contains an organic solvent (C). This organic solvent (C) should be capable of dissolving components (A1) to (A3) and component (A), but is not otherwise particularly limited. The organic solvent (C) can be exemplified by aromatic hydrocarbons such as toluene, xylene, and so forth; alcohols such as methanol, ethanol, isopropanol, butanol, isobutanol, and so forth; esters such as ethyl acetate, butyl acetate, isobutyl acetate, and so forth; and mixtures of the preceding. Component (C) is incorporated in an amount sufficient to dissolve component (A) and generally is incorporated in the range of 100 to 1900 weight parts per 100 weight parts component (A) and is preferably incorporated in an amount that provides a nonvolatile fraction in the inventive composition of 5 weight % to 50 weight %. Component (C) is unnecessary when component (A) is a liquid at ambient temperature that is suitable for the coating process.

The coating agent composition of the present invention comprises the previously described components (A) and (B) or components (A) to (C), but in addition to these components preferably contains an aminosilane coupling agent (component (D)) in order to improve the adhesiveness. This aminosilane coupling agent can be exemplified by 3-aminopropyltriethoxysilane, 3-aminopropyltrimethoxysilane, 3-aminopropylmethyldiethoxysilane, 3-aminopropylmethyldimethoxysilane, 3-(2-aminoethyl)aminopropyltrimethoxysilane, 3-(2-aminoethyl)aminopropylmethyldimethoxysilane, and 3-anilinopropyltrimethoxysilane. The amount of incorporation for this component is preferably in the range of 0.1 to 10 weight parts per 100 weight parts component (A).

The coating agent composition of the present invention may as necessary contain additives such as a dehydrating agent, leveling agent, thickener, UV absorber, and so forth. The dehydrating agent can be exemplified by methyl orthoformate, ethyl orthoformate, methyl orthoacetate, ethyl orthoacetate, and so forth. The leveling agent can be exemplified by various polyether-modified silicone oils. The composition of the present invention can also be used as a paint by the addition thereto of colorant (e.g., various pigments and dyes), carbon black, charge control agents, aluminum paste, talc, glass frit, metal powder, and so forth.

After the composition according to the present invention has been coated on a substrate, a cured film can be formed by standing at room temperature or by the application of heat. Heretofore known methods can be used for application to substrate, e.g., brush application, spraying, immersion or dipping, flow coater, knife coater, spin coater, and so forth. The thickness of the coating film may be freely selected, but is preferably 0.1 to 50 μM. The film thickness is preferably 5 to 100 μm when the inventive composition is used as a paint with the incorporation thereinto of pigment. From a standpoint of preferable coated material, the inventive composition may be used with substrates such as metals, e.g., iron, stainless steel, aluminum, alumite, duralumin, and so forth; metal oxides such as iron oxide, ferrite, alumina, zinc oxide, and so forth; inorganic substrates such as mortar, slate, concrete, glass, ceramic, and so forth; wood and plywood; and resins such as thermosetting resins, thermoplastic resins, FRP, and so forth. The shape of the substrate can be exemplified by sheet, plate, block, film, granule, and powder. Among the preceding, the composition according to the present invention is particularly useful as a coating agent for thermoplastic resins, metal micropowders, metal oxide micropowders, and magnetic micropowders because the inventive composition exhibits an excellent adhesion to these substrates. In addition, due to its excellent water repellency and durability, the coating agent of the present invention is also very useful as a coating agent in applications where a high transparency and a strong staining resistance are required, for example, for touch panel surfaces of electric appliance or glass-substitute transparent thermoplastic resin board.

EXAMPLES

The present invention is described in detail in the following with examples. "%" denotes "weight %" in the examples. The properties of the acrylic copolymers obtained in the synthesis examples and the characteristics of the cured films obtained in the examples were evaluated by the following methods.

[Properties of the Acrylic Copolymers]

Weight-average molecular weight: determined on the basis of polystyrene standards by gel permeation chromatography Nonvolatile fraction: 1 g of the acrylic copolymer (toluene solution) was weighed into an aluminum dish; the weight was measured after heating for 1 hour at 150° C.; and the nonvolatile fraction was calculated using the following formula.

nonvolatile fraction (%)=(pre-heating weight−post-heating weight)×100/preheating weight Refractive index (RI): This was measured with an ATSUBE refractometer from ERMA Inc.

[Properties of the Cured Films]

Pencil hardness of the film (referred to below simply as the "pencil hardness"): This was measured in accordance with JIS K 5400 and was scored according to the following scale.

++: 3H and higher
+: F to 2H
x: HB and lower

Water repellency: This was evaluated based on the contact angle versus water, which was measured using a contact angle meter (CA-Z from Kyowa Interface Science Co., Ltd.). The water repellency was evaluated according to the following scale.

++: greater than 95°
+: 90 to 95°
x: less than 90° C.

Durability of coated layer: The cured layer was rubbed 10 times with Bon Star Steel Wool No. 0000 from Nihon Steel Wool Co., Ltd., and the presence/absence of scratching in the surface of the cured film was evaluated according to the following scale.

++: no change
+: faint scratching (faint whitening)
x: scratching (whitening)

Reference Example 1

Production of 3-methacryloxypropyltris(trimethylsiloxy)silane 38.7 g of hexamethyldisiloxane, 0.05 g of trifluoromethanesulfonic acid, and 28.6 g of acetic acid were introduced into a stirrer-equipped flask and were heated to 50° C. 26.3 g of 3-methacryloxypropyltrimethoxysilane was then added dropwise and the reaction was continued for 2 hours. Washing with water was carried out twice followed by reheating to 60° C.; 0.016 g of trifluoroacetic acid and 6.32 g of hexamethyldisilazane were added and the reaction was completed. Washing with water was carried out twice and the remaining hexamethyldisiloxane, acetic acid, and other low-boiling substances were finally stripped off over 2 hours at 100° C. and 10 torr to obtain the intended product.

Synthesis Examples 1 to 6

Production of Acrylic Copolymers 1 to 6

Toluene was introduced into a stirrer-equipped flask in the quantity reported in Table 1 (reported as the starting toluene) and the temperature was raised to 90° C. under a current of nitrogen gas. Then, (a1) 3-methacryloxypropyltrimethoxysilane, (a2-1) methyl methacrylate, (a2-2) 2-(dimethylamino) ethyl methacrylate, and (a3) the 3-methacryloxypropyltris (trimethylsiloxy)silane prepared in Reference Example 1 and having the formula $CH_2$=CMe-CO—$C_3H_6$—Si(OSiMe$_3$)$_3$ (wherein Me=methyl) were introduced in the quantities reported in Table 1 below. After the completion of the dropwise addition, a solution of the 2,2'-azobis-2-methylbutyronitrile dissolved in 10 g toluene was added and radical copolymerization was carried out by mixing for 3 hours at 90 to 100° C. to yield a methacrylic copolymer having the weight-average molecular weight reported in Table 1. Each of the resulting methacrylic copolymers was diluted with toluene so as to adjust the nonvolatile fraction in the methacrylic copolymer solution to 14 weight % (acrylic copolymers 1 to 8). The refractive index of the resulting copolymer solutions are reported in Table 1. No change in appearance was seen when these methacrylic copolymer solutions were held for 3 months at room temperature.

With reference to the Synthesis Examples 1 to 8 reported in Table 1, the acrylic copolymers 1 and 2 obtained in Synthesis Examples 1 and 2 were used in Examples 1 to 3, infra. On the other hand, in Synthesis Examples 3 to 8, the amount of component (A2) and/or (A3) reacted, the molar ratio (A1)/{(A1)+(A2)+(A3)}, or the combination of the preceding did not conform to the scope specified in the claims of this patent application, and the acrylic copolymers 3 to 8 yielded by these synthesis examples were used in Comparative Examples 1 to 6. Synthesis Example 3 corresponds to the methacrylic copolymer of Synthesis Example 1 in paragraph number 0020 in the previously cited Patent Reference 8. Synthesis Example 4 corresponds to the methacrylic copolymer of Synthesis Example 2 in paragraph number 0021 in the previously cited Patent Reference 8. Synthesis Example 5 corresponds to the "methacrylic copolymer with a weight-average molecular weight of 25,000" used in Comparative Example 5 in paragraph number 0031 in the previously cited Patent Reference 8.

TABLE 1

| | | acrylic copolymer no. | | | | | | | |
|---|---|---|---|---|---|---|---|---|---|
| | | 1 | 2 | 3 | 4 | 5 | 6 | 7 | 8 |
| | | | | | <Synthesis Example No.> | | | | |
| | | 1 | 2 | 3 | 4 | 5 | 6 | 7 | 8 |
| | | | | | <Example/Comparative Example> | | | | |
| | | used in the examples | | used in the comparative examples | | | | | |
| (a1) | MPTMSi | 49.55 | 44.90 | 112.97 | 87.53 | 63.27 | 73.99 | 26.00 | 50.09 |
| (a2-1) | MMA | 87.39 | 66.08 | 113.55 | 92.62 | 63.61 | 160.61 | 26.21 | 71.97 |
| (a2-2) | DMAEMA | 0.00 | 37.07 | 0.00 | 51.78 | 0.00 | 0.00 | 0.00 | 0.00 |
| (a3) | MPT(TMS)Si | 112.45 | 101.35 | 22.74 | 17.32 | 122.58 | 14.53 | 197.41 | 127.38 |
| AMBN | | 2.42 | 2.39 | 2.97 | 2.99 | 2.14 | 3.50 | 1.51 | 2.21 |
| toluene (nonvolatile fraction: 14 wt %) | | 748.18 | 748.21 | 747.77 | 747.76 | 748.40 | 747.38 | 748.86 | 748.34 |
| (starting toluene) | | 251.82 | 251.79 | 252.23 | 252.24 | 251.60 | 252.62 | 251.14 | 251.66 |
| {component (a2-1) + component (a2-2)} (mol)/component (a1) (mol) | | 4.33 | 4.92 | 2.47 | 3.53 | 2.47 | 5.33 | 2.48 | 3.53 |
| component (a3) (mol)/component (a1) (mol) | | 1.33 | 1.33 | 0.12 | 0.12 | 1.14 | 0.12 | 4.46 | 1.49 |
| component (a1) (mol)/{component (a1) + component (a2-1) + component (a2-2) + component (a3)} (mol) | | 0.15 | 0.14 | 0.28 | 0.22 | 0.22 | 0.16 | 0.13 | 0.17 |

TABLE 1-continued

| | acrylic copolymer no. | | | | | | | |
|---|---|---|---|---|---|---|---|---|
| | 1 | 2 | 3 | 4 | 5 | 6 | 7 | 8 |
| | | | | <Synthesis Example No.> | | | | |
| | 1 | 2 | 3 | 4 | 5 | 6 | 7 | 8 |
| | | | | <Example/Comparative Example> | | | | |
| | used in the examples | | | used in the comparative examples | | | | |
| weight-avg. molecular weight (MW) | 41000 | 32000 | 26000 | 20000 | 25000 | 27000 | 66900 | 47000 |
| refractive index (RI) | 1.49 | 1.49 | 1.49 | 1.49 | 1.49 | 1.49 | 1.48 | 1.49 |

Components (a1), (a2), and (a3) and AMBN in the table denote the following compounds, respectively.
(a1) MPTMSi: 3-methacryloxypropyltrimethoxysilane (molecular weight = 248.4)
(a2-1) MMA: methyl methacrylate (molecular weight = 101.1)
(a2-2) DMAEMA: 2-(dimethylamino)ethyl methacrylate (molecular weight = 157.2)
(a3) MPT(TMS)Si: 3-methacryloxypropyltris(trimethylsiloxy)silane (molecular weight = 422.8)
AMBN: 2,2'-azobis-2-methylbutyronitrile (molecular weight = 182.2)

Example 1

A coating agent composition was prepared by mixing 33.3 g of toluene, 0.47 g of tetrabutyl titanate (b1) (50% ligroin solution), and 46.7 g of the methacrylic copolymer solution (acrylic copolymer 1, nonvolatile fraction=14%) obtained in Synthesis Example 1. This was flow coated on a stainless steel sheet and then heated for 1 hour at 200° C. to obtain a transparent cured film. The resulting cured film had homogeneously flat surface and was uniform and had an excellent adherence to the substrate. The characteristics of this cured film are reported in Table 2.

Example 2

A transparent cured film was obtained by operating as in Example 1, but in this case the methacrylic copolymer solution obtained in Synthesis Example 1 and used in Example 1 was replaced with the methacrylic copolymer solution obtained in Synthesis Example 2 (acrylic copolymer 2, nonvolatile fraction=14%). The resulting cured film had homogeneously flat surface and was uniform and had an excellent adherence to the substrate. The characteristics of this cured film are reported in Table 2.

Example 3

A transparent cured film was obtained by operating as in Example 1, but in this case 0.23 g (b2) dibutyltin dilaurate was used as the condensation reaction-promoting catalyst in place of the (b1) tetrabutyl titanate (50% ligroin solution) used in Example 1. The resulting cured film had homogeneously flat surface and was uniform and had an excellent adherence to the substrate. The characteristics of this cured film are reported in Table 2.

Comparative Examples 1 to 6

Transparent cured films were obtained by operating as in Example 1, but replacing the methacrylic copolymer solution obtained in Synthesis Example 1 and used in Example 1 with the respective methacrylic copolymer solutions obtained in Synthesis Examples 3 to 8 (acrylic copolymers 3 to 8, nonvolatile fraction=14%) as shown in Table 2. The characteristics of the cured films obtained in this manner are reported in Table 2.

TABLE 2

| | example/comparative example | | | | | | | | |
|---|---|---|---|---|---|---|---|---|---|
| | example | | | comparative example | | | | | |
| No. | 1 | 2 | 3 | 1 | 2 | 3 | 4 | 5 | 6 |
| acrylic copolymer no. | 1 | 2 | 1 | 3 | 4 | 5 | 6 | 7 | 8 |
| acrylic copolymer (g) | 46.7 | 46.7 | 46.7 | 46.7 | 46.7 | 46.7 | 46.7 | 46.7 | 46.7 |
| (b1) tetrabutyl titanate (50% ligroin solution) (g) | 0.47 | 0.47 | — | 0.47 | 0.47 | 0.47 | 0.47 | 0.47 | 0.47 |
| (b2) dibutyltin dilaurate (g) | — | — | 0.23 | — | — | — | — | — | — |
| toluene (g) | 33.3 | 33.3 | 33.3 | 33.3 | 33.3 | 33.3 | 33.3 | 33.3 | 33.3 |
| pencil | F | 3H | H | 5H | 7H | F | 6H | 2B | 2H |

TABLE 2-continued

| | example/comparative example | | | | | | | | |
| | example | | | comparative example | | | | | |
| No. | 1 | 2 | 3 | 1 | 2 | 3 | 4 | 5 | 6 |
| --- | --- | --- | --- | --- | --- | --- | --- | --- | --- |
| hardness | + | ++ | + | ++ | ++ | + | ++ | x | + |
| water repellency (contact angle versus water) | 100.3 ++ | 98.7 ++ | 101.2 ++ | 88.3 x | 87.7 x | 100.8 ++ | 86.8 x | 102.7 ++ | 101.7 ++ |
| film durability | faint whitening + | no change ++ | faint whitening + | no change ++ | no change ++ | whitening x | no change ++ | whitening x | whitening x |

The cured films of Examples 1 to 3 according to the present invention have a high water repellency (contact angle versus water) while also having an excellent performance with regard to the other characteristics required of films, e.g., pencil hardness and durability, and as a consequence have the advantage of providing physical film characteristics that are excellent as a whole. In contrast, the cured films obtained in Comparative Examples 1, 2, and 4 exhibit a water repellency (contact angle versus water) that is inferior to that exhibited by the examples of the present invention. On the other hand, the cured films obtained in Comparative Examples 3, 5, and 6, while having the same water repellency (contact angle versus water) as in the present invention, exhibit a film durability that is inferior to that exhibited by the examples of the present invention.

The invention claimed is:

1. A coating agent composition that comprises
   (A) 100 weight parts of an acrylic copolymer that has a weight-average molecular weight of 10,000 to 100,000 and that is obtained by the radical copolymerization of
   (A1) a silane compound represented by general formula (1)

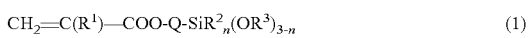

in the formula, $R^1$ is the hydrogen atom or methyl group; Q is $C_{2-6}$ divalent aliphatic hydrocarbyl group; $R^2$ is unsubstituted or substituted $C_{1-8}$ monovalent hydrocarbyl group; $R^3$ is $C_{1-4}$ aliphatic hydrocarbyl group; and n is an integer from 0 to 2,
   (A2) at least one compound that contains a vinyl polymerizable unsaturated bond, said compound being selected from acrylic compounds excluding components (A1) and (A3), vinylic compounds, and styrenic compounds, at 3.70 to 6.20 moles per 1 mole component (A1), and
   (A3) a siloxysilane compound represented by general formula (2), at 1.05 to 1.80 moles per 1 mole component (A1)

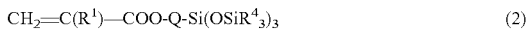

in the formula, $R^1$ and Q are defined as above and $R^4$ is $C_{1-4}$ alkyl group
   at a molar ratio $(A1)/\{(A1)+(A2)+(A3)\}=0.11$ to 0.17; and
   (B) a condensation reaction-promoting catalyst in a catalytic amount.

2. The coating agent composition according to claim 1, that further comprises (C) organic solvent, in an amount sufficient to dissolve component (A).

3. The coating agent composition according to claim 1, that further comprises (D) aminosilane coupling agent, at 0.1 to 10 weight parts per 100 weight parts component (A).

4. The coating agent composition according to claim 3, characterized in that component (D) is selected from the group consisting of 3-aminopropyltriethoxysilane, 3-aminopropyltrimethoxysilane, 3-aminopropylmethyldiethoxysilane, 3-aminopropylmethyldimethoxysilane, 3-(2-aminoethyl)aminopropyltrimethoxysilane, 3-(2-aminoethyl)aminopropylmethyldimethoxysilane, and 3-anilinopropyltrimethoxysilane.

5. The coating agent composition according to claim 1, characterized in that the acrylic copolymer is obtained by radical copolymerization using an azo-compound at 0.30 to 0.99 mole per 100 moles of the total of components (A1) to (A3).

6. The coating agent composition according to claim 1, characterized in that component (A2) is an alkyl methacrylate.

7. The coating agent composition according to claim 1, wherein component (A1) is a silane compound selected from the group consisting of 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, and 3-methacryloxypropylmethyldiethoxysilane.

8. The coating agent composition according to claim 3, characterized in that the acrylic copolymer is obtained by radical copolymerization using an azo-compound at 0.30 to 0.99 mole per 100 moles of the total of components (A1) to (A3).

9. The coating agent composition according to claim 3, characterized in that component (A2) is an alkyl methacrylate.

10. The coating agent composition according to claim 3, wherein component (A1) is a silane compound selected from the group consisting of 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, and 3-methacryloxypropylmethyldiethoxysilane.

11. The coating agent composition according to claim 1 wherein 4.1 to 5.5 moles of component (A2) are present per 1 mole of component (A1), and wherein 1.2 to 1.6 moles of component (A3) are present per mole of component (A1).

12. The coating agent composition according to claim 1 wherein components (A1), (A2), and (A3) are provided at a molar ratio $(A1)/\{(A1)+(A2)+(A3)\}=0.12$ to 0.16.

13. A coating agent composition that comprises
(A) 100 weight parts of an acrylic copolymer that has a weight-average molecular weight of 10,000 to 100,000 and that is obtained by the radical copolymerization of
(A1) 3-methacryloxypropyltrimethoxysilane,
(A2) methyl methacrylate and 2-(dimethylamino)ethyl methacrylate in a total amount ranging from 3.70 to 6.20 moles per 1 mole component (A1),
(A3) methacryloxy propyltris(trimethylsiloxy)silane at 1.05 to 1.80 moles per 1 mole component (A1),
at a molar ratio (A1)/{(A1)+(A2)+(A3)}=0.12 to 0.16; and
(B) a condensation reaction-promoting catalyst in a catalytic amount.

14. The coating agent composition according to claim 13 wherein 4.1 to 5.5 moles of component (A2) are present per 1 mole of component (A1), and wherein 1.2 to 1.6 moles of component (A3) are present per mole of component (A1).

15. The coating agent composition according to claim 13, that further comprises (D) aminosilane coupling agent, at 0.1 to 10 weight parts per 100 weight parts component (A).

16. The coating agent composition according to claim 13, characterized in that the acrylic copolymer is obtained by radical copolymerization using an azo-compound at 0.30 to 0.99 mole per 100 moles of the total of components (A1) to (A3).

17. A coating agent composition that comprises
(A) 100 weight parts of an acrylic copolymer that has a weight-average molecular weight of 10,000 to 100,000 and that is obtained by the radical copolymerization of
(A1) a silane compound selected from the group consisting of 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, 3-methacryloxypropylmethyldiethoxysilane, and combinations thereof,
(A2) a compound containing a vinyl polymerizable unsaturated bond included in an amount ranging from 3.70 to 6.20 moles per 1 mole component (A1) and being selected from methyl methacrylate, methyl acrylate, ethyl methacrylate, ethyl acrylate, butyl methacrylate, butyl acrylate, 2-(dimethylamino)ethyl methacrylate, 2-(dimethylamino)ethyl acrylate, 3-(dimethylamino)propyl methacrylate, 3-(dimethylamino)propyl acrylate, 2-(diethylamino)ethyl methacrylate, 2-(diethylamino)ethyl acrylate, and combinations thereof,
(A3) a tris(trialkylsiloxy)silane compound included in an amount ranging from 1.05 to 1.80 moles per 1 mole component (A1) and being selected from $CH_2$=CMe-COO—$C_3H_6$—Si(OSiMe$_3$)$_3$, $CH_2$=CH—COO—$C_3H_6$—Si(OSiMe$_3$)$_3$, $CH_2$=CMe-COO—$C_4H_8$Si(OSiMe$_3$)$_3$, $CH_2$=CMe-COO—$C_3H_6$—Si(OSiEt$_3$)$_3$, $CH_2$=CH—COO—$C_3H_6$—Si(OSiEt$_3$)$_3$, $CH_2$=CMe-COO—$C_4H_8$—Si(OSiEt$_3$)$_3$, $CH_2$=CMe-COO—$C_3H_6$—Si(OSiPr$_3$)$_3$, $CH_2$=CH—COO—$C_3H_6$—Si(OSiPr$_3$)$_3$, $CH_2$=CMe-COO—$C_4H_8$—Si(OSiPr$_3$)$_3$, and combinations thereof, at a molar ratio (A1)/{(A1)+(A2)+(A3)}=0.12 to 0.16, wherein "Me" designates a methyl group, "Et" designates an ethyl group, and "Pr" designates a propyl group; and
(B) a condensation reaction-promoting catalyst in a catalytic amount.

18. The coating agent composition according to claim 17 wherein 4.1 to 5.5 moles of component (A2) are present per mole component (A1), and wherein 1.2 to 1.6 moles of component (A3) are present per mole component (A1).

19. The coating agent composition according to claim 17, that further comprises (D) aminosilane coupling agent, at 0.1 to 10 weight parts per 100 weight parts component (A).

20. The coating agent composition according to claim 17, characterized in that the acrylic copolymer is obtained by radical copolymerization using an azo-compound at 0.30 to 0.99 mole per 100 moles of the total of components (A1) to (A3).

* * * * *